Dec. 7, 1954   F. ROYT   2,696,053
ASTRONOMICAL LOCATOR
Filed May 4, 1953   2 Sheets-Sheet 1
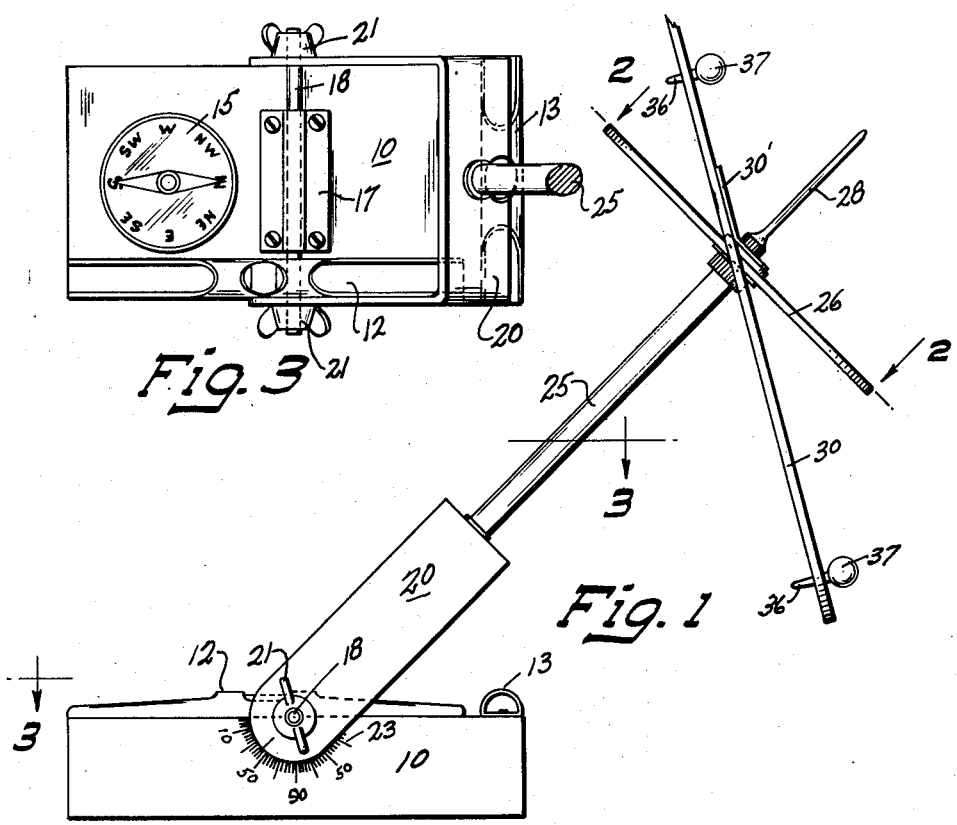
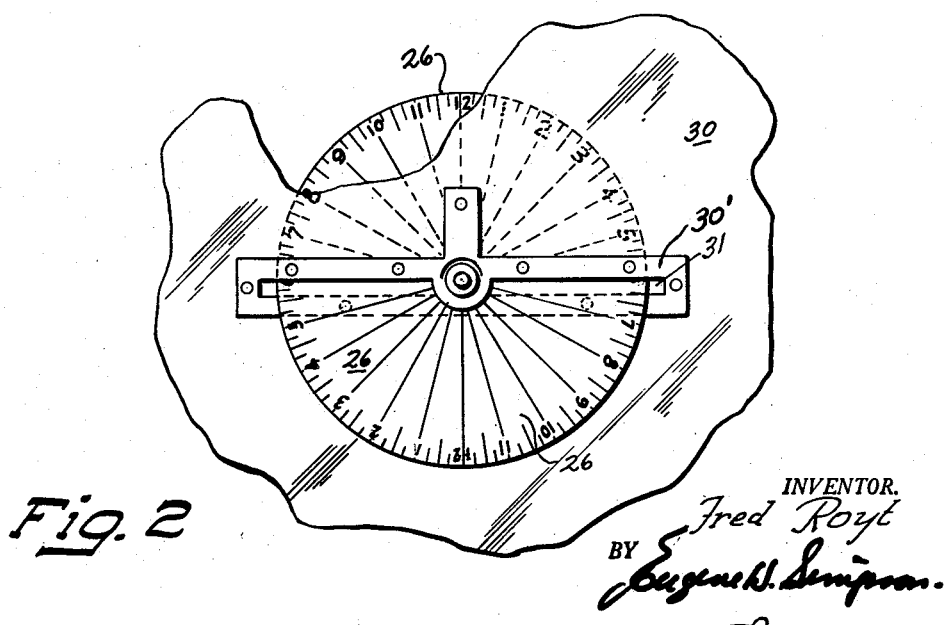
INVENTOR.
Fred Royt
BY
Attorney Dec. 7, 1954
F. ROYT
2,696,053
ASTRONOMICAL LOCATOR
Filed May 4, 1953
2 Sheets-Sheet 2
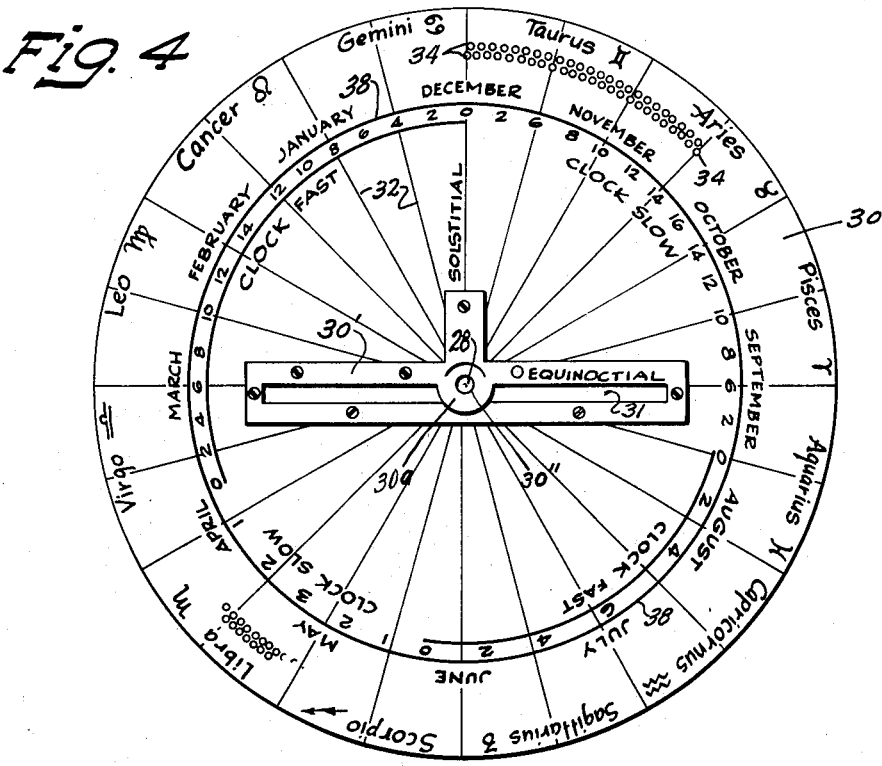
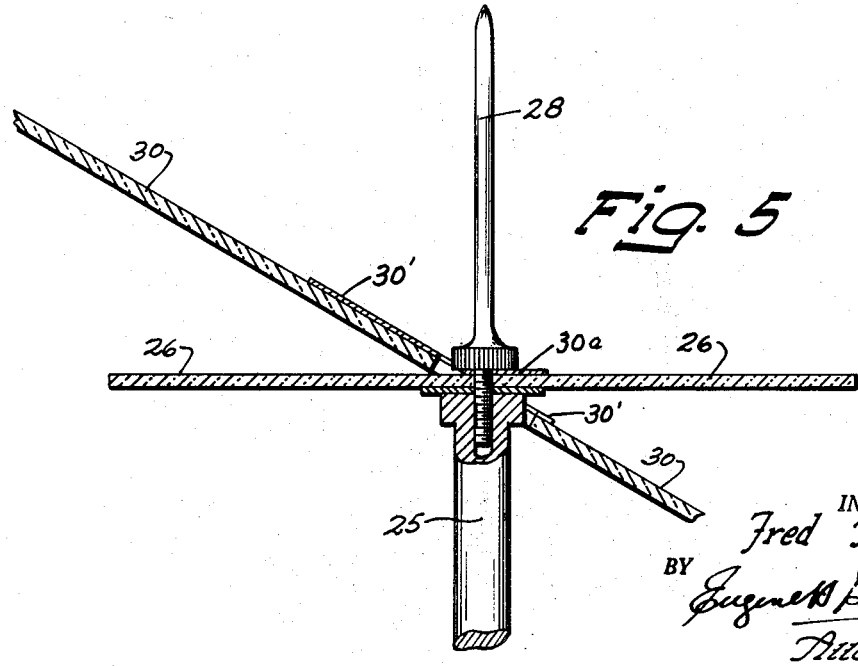
INVENTOR.
Fred Royt
BY
Eugene H. Simpson
Attorney

United States Patent Office 2,696,053
Patented Dec. 7, 1954

2,696,053

ASTRONOMICAL LOCATOR

Fred Royt, Milwaukee, Wis.

Application May 4, 1953, Serial No. 352,743

2 Claims. (Cl. 33—61)

This invention relates to a device to enable an observer to locate readily the various constellations in the sky at any hour of the day or at any time of the year.

The twelve signs of the zodiac are each represented in the skies by constellations which, for all practical purposes, are fixed in position in the sky relative to the other stars. However, due to the difference between solar or sun time and sidereal or star time, these constellations appear in the skies at different times during the year. As a result of this apparent shift in position of the various constellations, it is extremely hard for an amateur to recognize the constellations and particularly the signs of the zodiac with any degree of certainty.

It is an object of the present invention to provide a device which will give the approximate position of each of the twelve signs of the zodiac at any hour of the day or night.

Another object is to provide a sun dial which will either record solar time or on which the time may be set to determine astronomical positions.

Another object is to provide an astronomical locator which will enable an observer to locate any of the signs of the zodiac without referring to astronomical tables.

A further object is to provide an astronomical locator which will enable the user to determine the approximate right ascension of the sun.

A further object of the invention is to provide an astronomical locator by means of which approximate solar time may be determined at any hour.

A still further object is to provide an astronomical locator having a time indicator thereon, which will enable the observer, knowing the position of a sign of the zodiac in the sky, to determine the approximate time.

A still further object is to provide an astronomical locator which will give a mechanical solution of the equation of time.

Still further objects will become apparent upon consideration of the following specification, which, when taken in conjunction with the accompanying drawings, illustrates a preferred form of the invention.

In the drawings:

Fig. 1 is a side elevational view of an astronomical locator made in accordance with the present invention;

Fig. 2 is a plan view of the time indicator used in connection with the astronomical locator shown in Fig. 1, and is a view looking in the direction of the arrows 2—2 in Fig. 1;

Fig. 3 is a top plan view of the base of the locator shown in Fig. 1;

Fig. 4 is a plan view of the ecliptic plane of the locator; and

Fig. 5 is an enlarged cross-section showing the connection between the ecliptic and equatorial planes of the locator.

Referring to the drawings, the locator is built on a base 10 which has sufficient size and weight so that the center of gravity of the entire locator will always fall within the base and hence the locator is of itself always stable. The base may contain a pair of spirit levels 12 and 13 which are mounted at right angles to each other and enable the observer to level the base readily. A compass 15 enables the observer to orient the base with respect to the north pole.

The base 10 contains an axle clamp 17 which receives an axle 18 and holds the axle 18 parallel to one of the levels 12—13. The axle 18 receives a U-shaped yoke 20 which is adapted to turn on the axle and be retained in adjusted position by wing nuts 21—21. The wing nuts are threaded on the opposite ends of the axle 18 so that tightening the wing nuts clamps the yoke 20 in adjusted position.

The width and depth of the yoke 20 is sufficient so that the yoke clears both the sides and ends of the base 10 as it swings around through 180°.

The base 10 may have an angular scale 23 graduated into degrees so that the yoke 20 may be set on the scale for any degree of latitude at which the observer may be situated. The latitude readings are marked for ninety degrees latitude when the yoke is in vertical position to zero degrees latitude when the yoke 20 is in horizontal position.

The yoke 20 carries a supporting shaft 25 which is parallel to the axis of the yoke 20 and represents the north-south axis of the earth.

An equatorial disc 26 is mounted on the upper end of the shaft 25. The disc 26, which is mounted at right angles to the shaft 25, represents the equatorial plane of the earth. The disc 26 is made transparent so as to permit the observation of shadows therethrough.

The surface of the equatorial disc 26 is divided into twenty four segments representing the twenty four hours of the day. The dividing lines are marked with the twenty four hours of the day starting with twelve midnight at the uppermost point on the disc 26 and numbering clockwise from one to twelve noon and from twelve noon to twelve midnight.

A slender rod or stylus 28 screws into the top of the shaft 25 and forms a continuation thereof. The sun casts the shadow of either the stylus 28 or the shaft 25 during daylight hours to indicate the time on the disc 26.

An ecliptic disc 30 of clear transparent material having a slot 31 extending along a diameter is mounted about the disc 26 and at an angle of approximately 23°27′ so that the disc lies in the plane of the ecliptic. The disc 30 has secured to it by screws a yoke 30′, which carries a center tab 30a, bent outwardly at an angle of 23°27′ to the plane of the disc 30. The tab 30a has an aperture 30″ whereby the assembly of the disc 30 and yoke 30′ is mounted to pivot about the center of the shaft 25. The assembly is secured on the shaft 25 by a threaded extension on the inner end of the stylus 28 so that no matter to which position the disc 30 is turned the angle between the discs 26 and 30 remains the same—23°27′.

The ecliptic disc 30 is divided into twenty four segments by radial lines 32, two of the radial lines 32 coinciding with the line of intersection between the discs 26 and 30 which forms the equinoctial line as defined by the crossing of the equatorial plane by the ecliptic plane. These radial lines 32 form guide lines on the movable disc 30 to enable the disc 30 to be properly oriented and to enable one to locate constellations when so positioned.

The names of the months of the year are placed between adjacent segments starting with March on the equinoctial line (the line of intersection of the discs 26 and 30) and continuing counter-clockwise around the circle through February. The months are thus located on the disc 30 to correspond with the equation of time. The equinoctial line represents the twenty-first of March on the one side of the disc 30 and the twenty-second of September on the opposite side of the disc.

Since this is not a precision instrument but rather a locator, it suffices to divide the entire disc into 360 equal radial parts, the parts being marked by holes 34 drilled through the ecliptic disc 30. The holes 34 receive a stem 36 of a simulated earth or sun 37, which, when placed in its proper hole 34, enables the disc to be oriented at any time of the day or night.

The solution of the equation of time, showing the difference between clock time and sun time is placed about the periphery of the ecliptic disc 30 so that at any time of the year the correction may be made to the clock time in order to obtain true solar time. This solution of the equation of time is marked in a circle 38 on the disc 30 and shows the number of minutes the clock is fast or slow for the particular time of the year indicated by the simulated earth when in proper position as explained below.

The relative positions of the various constellations of the zodiac are indicated with the names of the constellations about the outer periphery of the disc 30 with the original symbols of the various constellations being placed in their original positions.

*Operation*

Before the time of observation, the latitude and longitude of the location of the observation must be determined roughly.

The latitude of the observer is set on the scale 23 and in the daytime preceding the evening observation the locator is set up in a clear space and leveled by means of the two spirit levels 12–13. The base 10 is then oriented until the longitudinal axis thereof is pointing due north, allowance having been made for the declination of the magnetic pole.

When the locator is thus oriented and adjusted the sun will cast the shadow of either the shaft 25 or the stylus 28 (depending on the time of year) which may be caught on a piece of paper held perpendicular to the edge of the disc 26 to give a true reading of solar time.

The ecliptic disc 30 may then be turned until its shadow appears on a piece of paper or other surface as a single straight line (rather than as an ellipse). At this point the entire locator is properly oriented with the skies, both as to the time of year and the hour of the day.

With the locator oriented a ball representing apparent sun is placed on the disc 30 with the stem 36 through one of the holes 34 so that the shadow cast by the apparent sun is alined with the stylus 28. When in this position, the apparent sun 37 is in the proper position for the day of the observation. This alinement is best determined by catching the shadows on a piece of white paper held along the lower edge of the disc 30.

When the apparent sun 37 is located in its proper position on the disc 30, a simulated earth may then be positioned in one of the holes 34 diametrically opposite the apparent sun, so that the apparent sun, the stylus and the earth are all alined.

When the locator is thus oriented the constellations are in the relative positions indicated on the periphery of the disc 30. However, during daylight hours part of the stars are in back of the sun where they can not be seen and the rest of the starts are to the rear of the earth where they may be observed only from a position on the other side of the world.

When it is desired to observe at night, the simulated sun and earth are placed in their proper positions for the day of observation during the daylight hours as directed above. After dark the ecliptic disc 30 may be rotated so that the simulated earth is at the upper portion of the equatorial disc 26.

The correct time is determined by consulting a watch or clock and correcting it for the distance from the standard time meridian and adding or substracting a correction as given by the solution of the equation of time on the circle 38 opposite the position of the simulated earth.

When the corrected time has been determined, the ecliptic disc 30 may be set in the correct position by alining the earth 37 and stylus 28 with the corrected time as indicated on the disc 26.

At this time the earth and sun have assumed their correct relative positions and hence the positions of the constellations is the same as that shown on the periphery of the disc 30. The constellations may therefore be located by sighting across the stylus 28 and between the dividing lines 32.

It is to be understood that the form of the invention herein shown and described is to be taken merely as a preferred embodiment thereof and that various changes in size, shape and arrangement of parts may be resorted to without departing from the spirit of the invention or the scope of the subjoined claims.

That which is claimed as new and is desired to be secured by United States Letters Patent is:

1. An astronomical locator comprising a shaft, means to aline said shaft parallel with the axis of the earth, an equatorial disc mounted in fixed position on the locator shaft, said disc being divided into twenty four equal parts representing the hours of the day, an ecliptic disc rotatably mounted on said shaft with a fixed angle between the two discs equal to the angle between the plane of the equator and the ecliptic plane, markings on the face of said ecliptic disc defining the relative positions of the constellations, and means mounted on the ecliptic disc cooperating with the time scale on said equatorial disc to orient the ecliptic disc to enable an observer to locate the constellations.

2. An astronomical locator comprising a shaft, means to aline said shaft parallel to the axis of the earth, an equatorial disc fixed on said shaft intermediate the ends thereof, said disc being divided into twenty four equal segments and marked with the twenty four hours of the day, an ecliptic disc rotatably mounted on the locator shaft with a fixed angle between the discs equal to the angle between the plane of the equator and the plane of the ecliptic, markings on the face of the ecliptic disc showing the relative positions of constellations, and means to mount an apparent sun and earth in their proper positions on the ecliptic disc, whereby the ecliptic disc may be oriented at any time to indicate the actual positions of the constellations in the heavens.

References Cited in the file of this patent

UNITED STATES PATENTS

| Number | Name | Date |
|---|---|---|
| 482,278 | Slater | Sept. 6, 1892 |
| 522,082 | Nichols | June 26, 1894 |
| 2,527,189 | Kittelson | Oct. 24, 1950 |